United States Patent
Lee et al.

(10) Patent No.: US 11,687,432 B2
(45) Date of Patent: Jun. 27, 2023

(54) DATA ACCESSING METHOD USING DYNAMIC SPEED ADJUSTMENT WITH AID OF THERMAL CONTROL UNIT, AND ASSOCIATED APPARATUS

(71) Applicant: Silicon Motion, Inc., Hsinchu County (TW)

(72) Inventors: Chun-Cheng Lee, Yilan County (TW); Che-Min Lin, Hsinchu (TW); Kuan-Chun Yu, Taoyuan (TW); Sheng-I Hsu, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 298 days.

(21) Appl. No.: 17/149,663

(22) Filed: Jan. 14, 2021

(65) Prior Publication Data

US 2022/0222160 A1    Jul. 14, 2022

(51) Int. Cl.
*G06F 11/30* (2006.01)
*G06F 13/16* (2006.01)
(Continued)

(52) U.S. Cl.
CPC ........ *G06F 11/3058* (2013.01); *G06F 11/002* (2013.01); *G06F 11/076* (2013.01);
(Continued)

(58) Field of Classification Search
CPC ... G06F 11/3058; G06F 11/002; G06F 11/076
See application file for complete search history.

(56) References Cited

U.S. PATENT DOCUMENTS

| 6,564,288 B2 * | 5/2003 | Olarig ................. G06F 1/206 711/105 |
| 8,438,358 B1 | 5/2013 | Kraipak |

(Continued)

FOREIGN PATENT DOCUMENTS

| TW | 200802400 | 1/2008 |
| TW | 200917269 | 4/2009 |

(Continued)

*Primary Examiner* — Amine Riad
(74) *Attorney, Agent, or Firm* — Winston Hsu (57) ABSTRACT

A data accessing method using dynamic speed adjustment with aid of a thermal control unit, and associated apparatus such as memory device, memory controller, etc. are provided. The data accessing method includes: utilizing a thermal control unit to start monitoring temperature at a predetermined intra-controller location of the memory controller; in response to at least one accessing request from a host device, controlling a transmission interface circuit to perform data transmission between the host device and the memory controller at an original communications speed, for accessing data in the NV memory; in response to the temperature being greater than a first temperature threshold, detecting an increment of the temperature between a first start time point and a first end time point; based on at least one first predetermined rule, determining a first communications speed according to the increment; and switching from the original communications speed to the first communications speed.

9 Claims, 9 Drawing Sheets

(51) Int. Cl.
  *G06F 11/00*   (2006.01)
  *G06F 12/02*   (2006.01)
  *G06F 11/07*   (2006.01)

(52) U.S. Cl.
  CPC ...... *G06F 11/3037* (2013.01); *G06F 12/0238* (2013.01); *G06F 13/1668* (2013.01)

(56) References Cited

U.S. PATENT DOCUMENTS

| | | |
|---|---|---|
| 2001/0014049 A1 | 8/2001 | Woo |
| 2004/0267409 A1 | 12/2004 | De Lorenzo |
| 2006/0002218 A1 | 1/2006 | Jain |
| 2009/0190427 A1 | 7/2009 | Brittain |
| 2012/0331207 A1 | 12/2012 | Lassa |
| 2014/0112370 A1 | 4/2014 | Hsu |
| 2018/0350410 A1 | 12/2018 | Curtis |
| 2020/0293438 A1 | 9/2020 | Walker |

FOREIGN PATENT DOCUMENTS

| | | |
|---|---|---|
| TW | 201719643 A | 6/2017 |
| WO | 2020/263315 A1 | 12/2020 |

\* cited by examiner

DATA ACCESSING METHOD USING DYNAMIC SPEED ADJUSTMENT WITH AID OF THERMAL CONTROL UNIT, AND ASSOCIATED APPARATUS

BACKGROUND OF THE INVENTION

1. Field of the Invention

The present invention is related to memory control, and more particularly, to a data accessing method using dynamic speed adjustment with aid of a thermal control unit, and associated apparatus such as a memory device, a memory controller of the memory device, and an electronic system equipped with the memory device.

2. Description of the Prior Art

Developments in memory technology have enabled the wide application of various portable and non-portable memory devices (e.g. memory cards conforming to the SD/MMC, CF, MS, XD or UFS specifications, solid state drives (SSDs), embedded storage devices conforming to the UFS or EMMC specifications, etc.). Improving access control of memories in these memory devices remains an issue to be solved in the art.

NAND flash memories may comprise single level cell (SLC) and multiple level cell (MLC) flash memories. In an SLC flash memory, each transistor used as a memory cell may have either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, during a data accessing of a memory device, high speed data transmission may lead to heat accumulation, which may cause degraded performance of the memory device, and more particularly, cause malfunction of the memory device. Hence, there is a need for a novel method and associated architecture to improve the performance of the memory device without introducing a side effect or in a way that is less likely to introduce a side effect.

SUMMARY OF THE INVENTION

It is an objective of the present invention to provide a data accessing method using dynamic speed adjustment with aid of a thermal control unit, and associated apparatus such as a memory device, a memory controller of the memory device, and an electronic system equipped with the memory device, in order to solve the above-mentioned problems.

It is another objective of the present invention to provide a data accessing method using dynamic speed adjustment with aid of a thermal control unit, and associated apparatus such as a memory device, a memory controller of the memory device, and an electronic system equipped with the memory device, in order to achieve optimal performance of the memory device.

At least one embodiment of the present invention provides data accessing method using dynamic speed adjustment with aid of a thermal control unit, where the data accessing method is applicable to a memory controller of a memory device. The memory device may comprise the memory controller and a non-volatile (NV) memory, and the NV memory may comprise at least one NV memory element (e.g. one or more NV memory elements). The data accessing method may comprise: utilizing a thermal control unit within the memory controller to start monitoring temperature at a predetermined intra-controller location of the memory controller; in response to at least one accessing request from a host device, controlling a transmission interface circuit of the memory controller to perform data transmission between the host device and the memory controller at an original communications speed, for accessing data in the NV memory; in response to the temperature being greater than a first temperature threshold, detecting an increment of the temperature between a first start time point and a first end time point, wherein a first time period from the first start time point to the first end time point corresponds to a first predetermined time difference; based on at least one first predetermined rule, determining a first communications speed according to the increment; and controlling the transmission interface circuit to switch from the original communications speed to the first communications speed, for performing data transmission between the host device and the memory controller at the first communications speed.

In addition to the above method, the present invention also provides a memory controller of a memory device, where the memory device comprises the memory controller and an NV memory. The NV memory may comprise at least one NV memory element (e.g. one or more NV memory elements). In addition, the memory controller comprises a processing circuit, and the processing circuit is arranged to control the memory controller according to a plurality of host commands from a host device, to allow the host device to access the NV memory through the memory controller. The memory controller further comprises a transmission interface circuit and a memory device protection circuit that are coupled to the processing circuit. The transmission interface circuit is arranged to perform communications with the host device, and the memory device protection circuit is arranged to perform memory device protection on the memory device. Additionally, the memory device protection circuit may comprise a thermal control unit, where the thermal control unit is arranged to perform thermal control, for triggering dynamic speed adjustment during data accessing. For example, the memory controller utilizes the thermal control unit to start monitoring temperature at a predetermined intra-controller location of the memory controller; in response to at least one accessing request from the host device, the memory controller controls the transmission interface circuit to perform data transmission between the host device and the memory controller at an original communications speed, for accessing data in the NV memory; in response to the temperature being greater than a first temperature threshold, the memory controller detects an increment of the temperature between a first start time point and a first end time point, wherein a first time period from the first start time point to the first end time point corresponds to a first predetermined time difference; based on at least one first predetermined rule, the memory controller determines a first communications speed according to the increment; and the memory controller controls the transmission interface circuit to switch from the original communications speed to the first communications speed, for performing data transmission between the host device and the memory controller at the first communications speed.

In addition to the above method, the present invention also provides the memory device comprising the above memory controller, wherein the NV memory is arranged to store information, and the memory controller is coupled to the NV memory, and is arranged to control operations of the memory device.

The present invention method and associated apparatus can guarantee that the memory device can operate properly in various situations without encountering the related art problems. For example, the data accessing method provides multiple control schemes for access control. With aid of the present invention method and associated apparatus, the memory device will not suffer from the existing problems of the related art, such as the degraded performance problem, the malfunction problem, etc.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
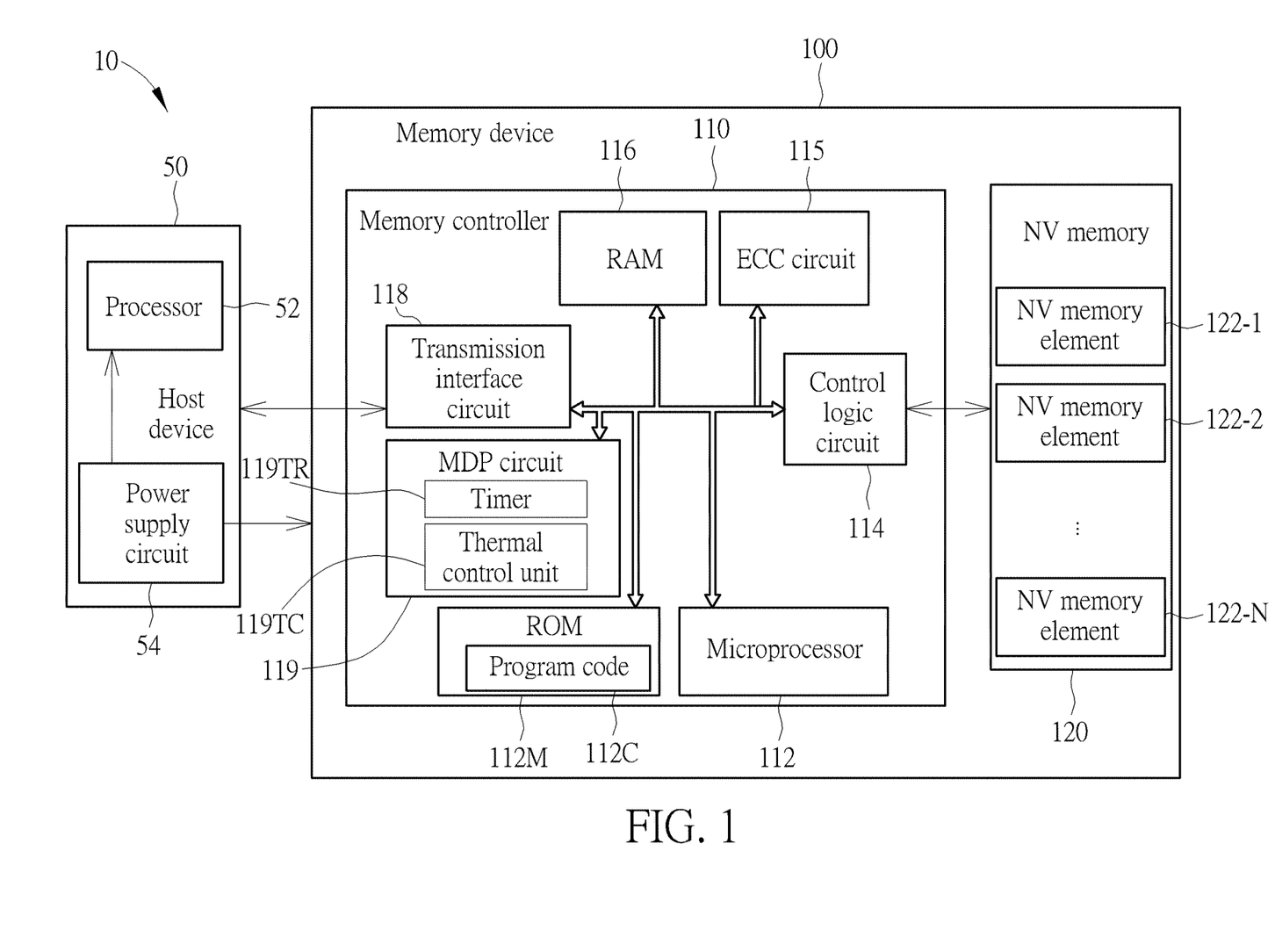
FIG. 1 is a diagram of an electronic system according to an embodiment of the present invention, where the electronic system comprises a host device and a memory device.

FIG. 1 is a diagram of an electronic system 10 according to an embodiment of the present invention, where the electronic system 10 comprises a host device 50 and a memory device 100. The host device 50 may comprise at least one processor (e.g. one or more processors) which may be collectively referred to as the processor 52, and may further comprise a power supply circuit 54 that is coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, and a personal computer such as a desktop computer and a laptop computer. Examples of the memory device 100 may include, but are not limited to: a solid state drive (SSD), and an embedded storage device such as that conforming to Universal Flash Storage (UFS) or embedded MMC (eMMC) specifications. According to this embodiment, the memory device 100 may comprise a memory controller 110 and a non-volatile (NV) memory 120, where the memory controller 110 is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, an error correction code (ECC) circuit 115, a random access memory (RAM) 116, a transmission interface circuit 118 and a memory device protection circuit 119 (labeled "MDP circuit" in FIG. 1, for brevity), where the above components can be coupled to one another via a bus. The RAM 116 is implemented by a Static RAM (SRAM), but the present invention is not limited thereto. The RAM 116 can be arranged to provide the memory controller 110 with internal storage space. For example, the RAM 116 can be utilized as a buffer memory for buffering data. In addition, the ROM 112M of this embodiment is arranged to store a program code 112C, and the microprocessor 112 is arranged to execute the program code 112C to control the access of the NV memory 120. Note that, in some examples, the program code 112C can be stored in the RAM 116 or any type of memory. Further, the ECC circuit 115 can be configured to protect data and/or perform error correction, where the ECC circuit 115 can protect data and/or perform error correction. The transmission interface circuit 118 can conform to a specific communications specification (e.g. UFS specification), and can perform communications according to the specific communications specification, for example, perform communications with the host device 50 for the memory device 100. The memory device protection circuit 119 can be configured to perform memory device protection on the memory device 100. For example, the memory device protection circuit 119 may comprise a timer 119TR and a thermal control unit 119TC, where the timer 119TR can perform timing control, and the thermal control unit 119TC can perform thermal control, for triggering dynamic speed adjustment during data accessing. With aid of the timing control of the timer 119TR and the thermal control of the thermal control unit 119TC, the memory controller 110 can perform dynamic speed adjustment during data accessing.

In this embodiment, the host device 50 may transmit host commands and corresponding logical addresses to the memory controller 110 to access the memory device 100. The memory controller 110 receives the host commands and the logical addresses, and translates the host commands into memory operating commands (which may be simply referred to as operating commands), and further controls the NV memory 120 with the operating commands to perform reading, writing/programing, etc. on memory units (e.g. data pages) having physical addresses within the NV memory 120, where the physical addresses may be associated with the logical addresses. When the memory controller 110 perform an erase operation on any NV memory element 122-n0 of the plurality of NV memory elements 122-1, 122-2, . . . , and 122-N (in which "n0" may represent any integer in the interval [1, N]), at least one physical block of multiple physical blocks of the NV memory element 122-n0 may be erased, where each physical block of the multiple physical blocks may comprise multiple physical pages (e.g. data pages), and an access operation (e.g. reading or writing) may be performed on one or more physical pages.

When the host device 50 accesses the memory device 100 (e.g. the NV memory 120 therein, with aid of the memory controller 110), an accessing request (e.g. a read request, a write request, etc.) from the host device 50 may carry a logical address, and the logical address may comprise a logical block address (LBA) indicating a logical block, and more particularly, may further comprise a logical page address indicating a logical page in the logical block. The memory device 100 (e.g. the memory controller 110) can store and update at least one logical-to-physical (L2P) address mapping table (e.g. one or more L2P address mapping tables) in the NV memory 120, to manage mapping relationships between logical blocks and physical blocks according to a block-based mapping control scheme, and more particularly, to manage mapping relationships between logical blocks and pages and physical blocks and pages according to a page-based mapping control scheme.

According to some embodiments, the memory device 100 may be implemented to be a memory card conforming to the SD/MMC, CF, MS, XD or UFS specifications, where the memory device 100 may be coupled to the host device 50 through an intermediate device such as a memory card reader, but the present invention is not limited thereto.

Figure 2:
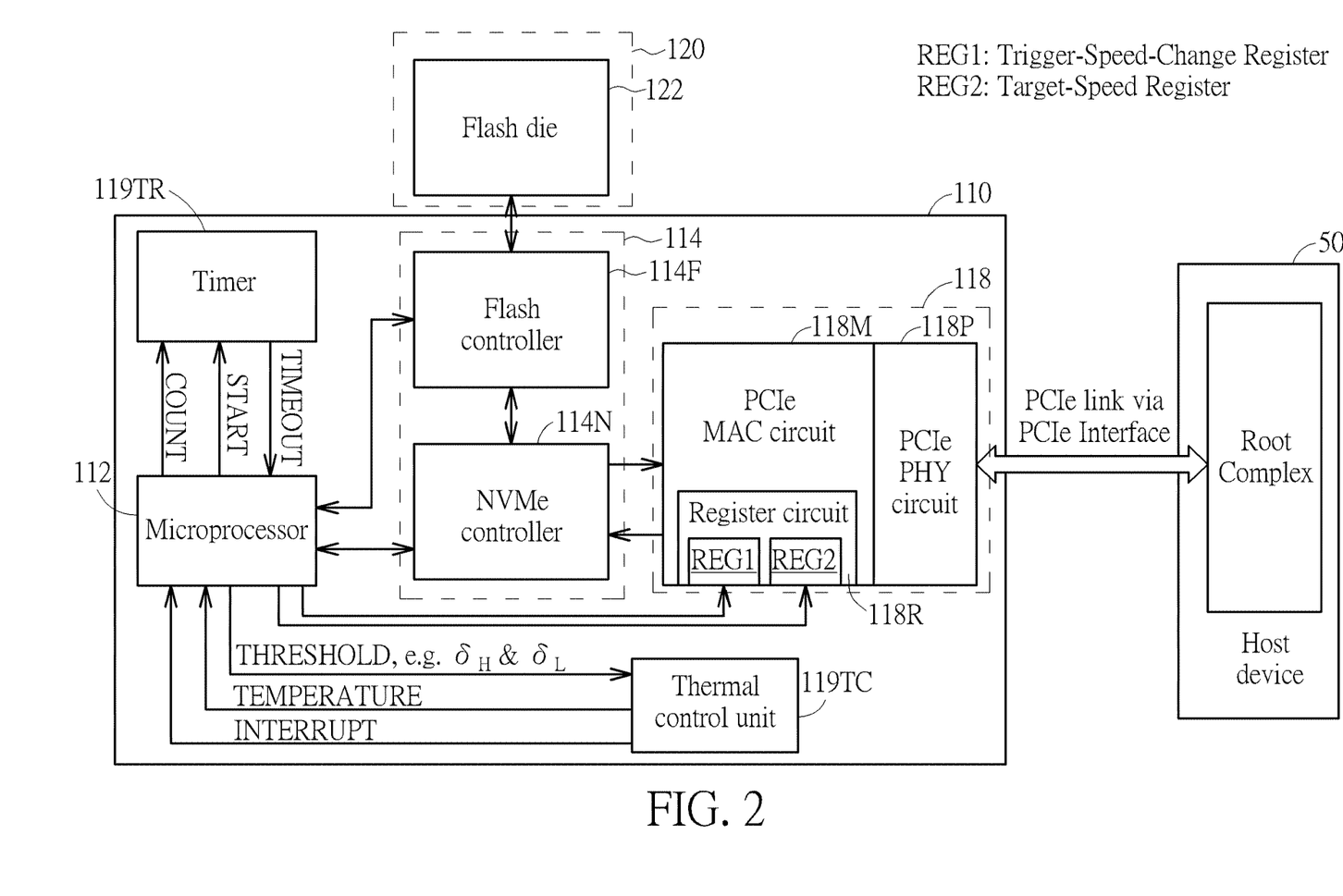
FIG. 2 illustrates a temperature-aware speed control scheme of a data accessing method using dynamic speed adjustment with aid of a thermal control unit according to an embodiment of the present invention.

FIG. 2 illustrates a temperature-aware speed control scheme of a data accessing method using dynamic speed adjustment with aid of a thermal control unit (e.g. the thermal control unit 119TC shown in FIG. 1) according to an embodiment of the present invention. The data accessing method is applicable to the electronic system 10 shown in FIG. 1, and more particularly, the memory device 100 and the memory controller 110 therein. The plurality of NV memory elements 122-1, 122-2, . . . , and 122-N of this embodiment can be implemented as a set of flash memory dies 122 (labeled "Flash die" for brevity). As shown in FIG. 2, the control logic circuit 114 may comprise a Flash controller 114F and a Non-Volatile Memory Express (NVMe) controller 114N, where the Flash controller 114F can control the NV memory 120 (e.g. the set of flash memory dies 122) with the memory operating commands, and the NVMe controller 114N can operate according to NVMe specification, to make the control logic circuit 114 be capable of controlling the NV memory 120 (e.g. the set of flash memory dies 122) in response to NVMe commands. In addition, the transmission interface circuit 118 can be configured to conform to PCIe specification, and therefore at least one portion (e.g. a portion or all) of the transmission interface circuit 118 can be regarded as the PCIe interface circuit of the memory controller 110, and a corresponding transmission interface circuit in the host device 50 can be configured to conform to PCIe specification, and therefore at least one portion (e.g. a portion or all) of the corresponding transmission interface circuit can be regarded as the PCIe interface circuit of the host device 50, such as the Root Complex in the host device 50 shown in FIG. 2. Additionally, the PCIe interface circuit within the transmission interface circuit 118 may comprise a PCIe Media Access Control (MAC) circuit 118M and a PCIe physical layer (PHY) circuit 118P, for performing associated operations regarding MAC and PHY, respectively. For example, the PCIe MAC circuit 118M may comprise a register circuit 118R, to allow the microprocessor 112 to perform associated control on the PCIe MAC circuit 118M, for controlling data speed adjustment during data accessing, where the register circuit 118R may comprise multiple registers such as the registers REG1, REG2, etc., and the microprocessor 112 can set the respective register values of the registers REG1, REG2, etc.

The host device 50 and the memory controller 110 can be configured to establish a PCIe link via the respective PCIe interface circuits of the host device 50 and the memory controller 110 (labeled "PCIe link via PCIe Interface" for brevity). Regarding data transmission between the host device 50 and the memory controller 110, the register REG1 can be utilized for triggering speed change, and therefore can be regarded as a Trigger-Speed-Change Register (TSCR), and the register REG2 can be utilized for setting a target communications speed (e.g. a transfer rate, typically measured in unit of gigatransfers/gigatransactions per second (GT/s) for PCIe interfaces), and therefore can be regarded as a Target-Speed Register (TSR). As shown in FIG. 2, the microprocessor 112 can control the timer 119TR with a predetermined counter value COUNT and a start counting signal START, and the timer 119TR can start counting in response to trigger of the start counting signal START and count until the predetermined counter value COUNT is reached, for performing the timing control for the microprocessor 112. When 1 the predetermined counter value COUNT is reached, the timer 119TR can send a timeout signal TIMEOUT (e.g. an interrupt such as a timeout interrupt) to notify the microprocessor 112 of timeout (e.g. the predetermined counter value COUNT is reached). In addition, the microprocessor 112 can control the thermal control unit 119TC with at least one threshold THRESHOLD such as a first temperature threshold $\delta_H$ and a second temperature threshold $\delta_L$, and the thermal control unit 119TC can monitor temperature T at a predetermined intra-controller location of the memory controller 110, send a temperature signal TEMPERATURE carrying the latest value of the temperature T to the microprocessor 112, and perform temperature-related detection on the temperature T according to one or more of the first temperature threshold $\delta_H$ and the second temperature threshold $\delta_L$. For example, when the temperature T is greater than the first temperature threshold $\delta_H$, the thermal control unit 119TC can send an interrupt signal INTERRUPT (e.g. another interrupt) to the microprocessor 112 to notify the microprocessor 112 of a first temperature-related detection result (e.g. the temperature T reaching the threshold THRESHOLD such as the first temperature threshold $\delta_H$, in an increasing direction of the temperature T). For another example, when the temperature T is less than the second temperature threshold $\delta_L$, the thermal control unit 119TC can send the interrupt signal INTERRUPT to the microprocessor 112 to notify the microprocessor 112 of a second temperature-related detection result (e.g. the temperature T reaching the threshold THRESHOLD such as the second temperature threshold $\delta_L$, in a decreasing direction of the temperature T).

Based on the temperature-aware speed control scheme shown in FIG. 2, the memory device 100 (e.g. the memory controller 110) can dynamically adjust a PCIe link speed such as the speed of a PCIe link between the host device 50 and the memory controller 110, to control the temperature and the power consumption of the memory device 100.

Figure 3:
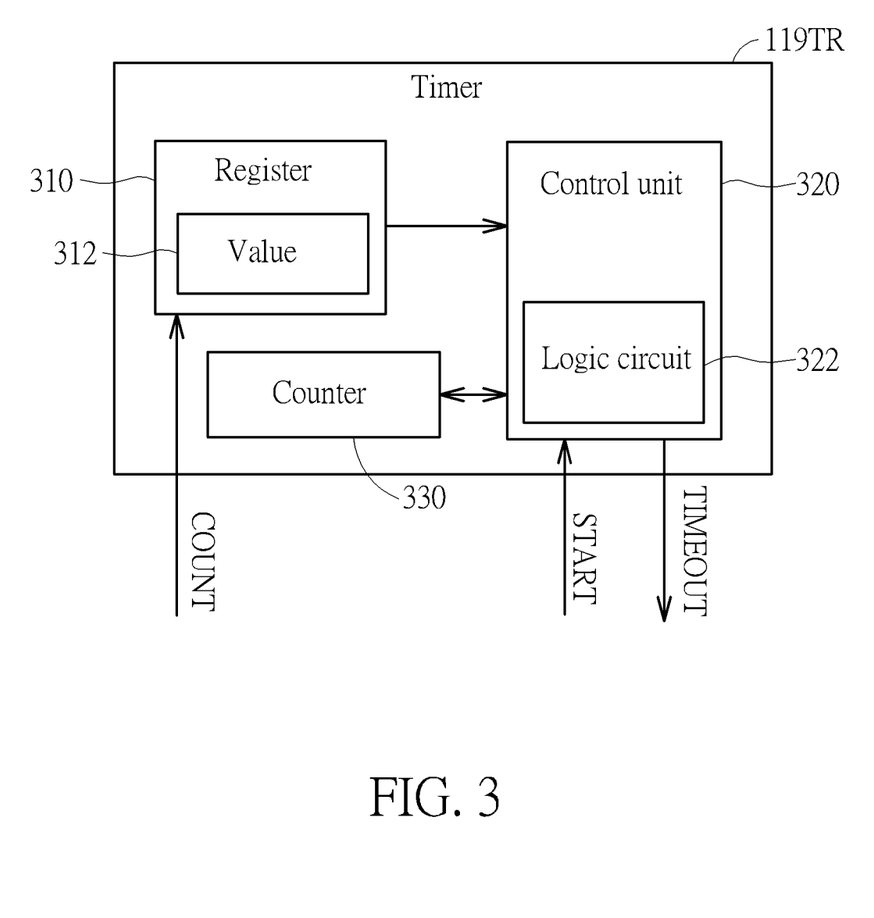
FIG. 3 illustrates some implementation details of the timer regarding the temperature-aware speed control scheme shown in FIG. 2 according to an embodiment of the present invention.

FIG. 3 illustrates some implementation details of the timer 119TR regarding the temperature-aware speed control scheme shown in FIG. 2 according to an embodiment of the present invention. The timer 119TR may comprise at least one register (e.g. one or more registers) such as the register 310, and comprise a control unit 320 and a counter 330, where the control unit 320 can be implemented with logic circuits 322. The timer 119TR can utilize the register 310 to store the predetermined counter value COUNT as the register value 312 (labeled "Value" for brevity) thereof. The control unit 320 can control operations of the timer 119TR. For example, the control unit 320 can clear the register 310 by default. The microprocessor 112 can write the predetermined counter value COUNT into the register 310 and then send the start counting signal START. In response to the trigger of the start counting signal START, the control unit 320 can obtain the predetermined counter value COUNT from the register 310 and control the counter 330 to start counting until the counter value of the counter 330 reaches the predetermined counter value COUNT. For example, the predetermined counter value COUNT may correspond to a predetermined time difference. When the counter value of the counter 330 reaches the predetermined counter value COUNT, which may indicate that the predetermined time difference is expired, the control unit 320 can send the timeout signal TIMEOUT to notify the microprocessor 112 of timeout (e.g. the counter value of the counter 330 reaches the predetermined counter value COUNT).

Figure 4:
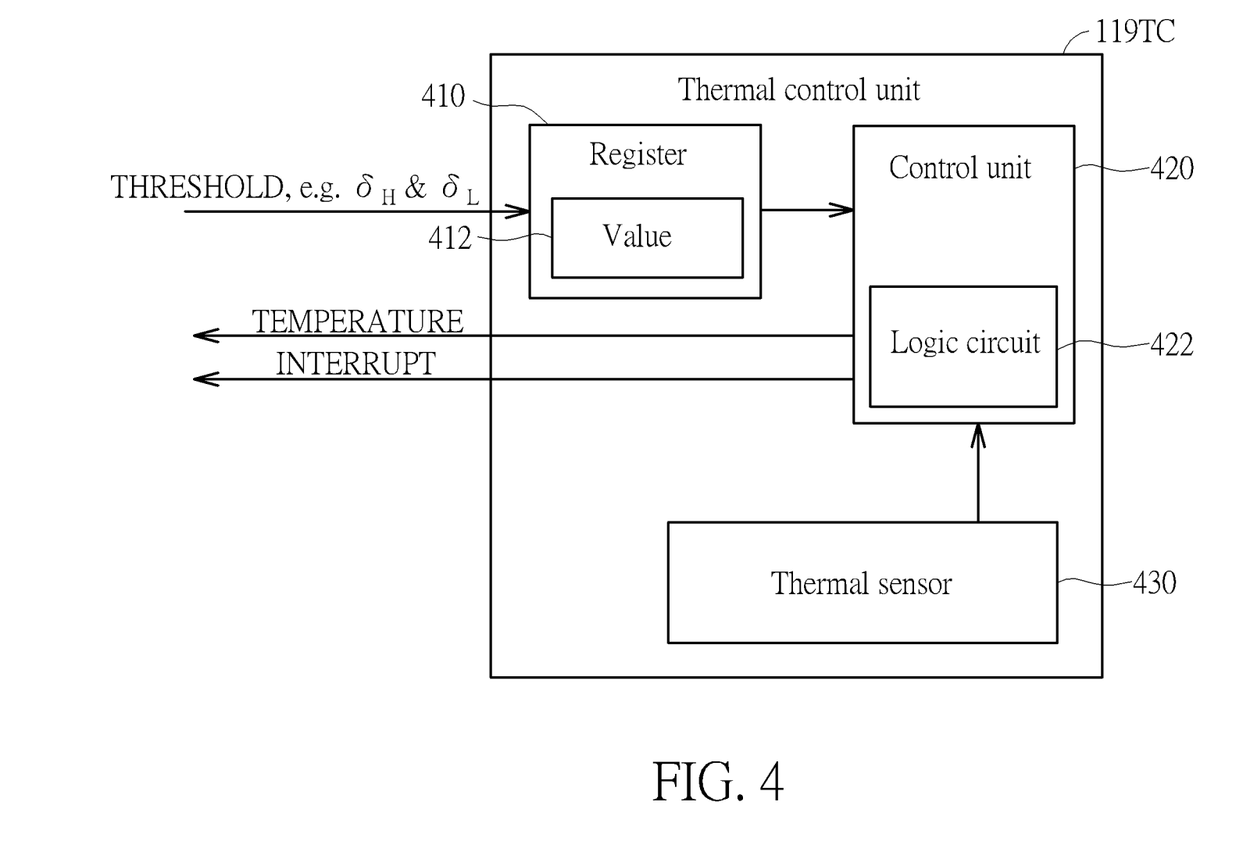
FIG. 4 illustrates some implementation details of the thermal control unit regarding the temperature-aware speed control scheme shown in FIG. 2 according to an embodiment of the present invention.

FIG. 4 illustrates some implementation details of the thermal control unit 119TC regarding the temperature-aware speed control scheme shown in FIG. 2 according to an embodiment of the present invention. The thermal control unit 119TC may comprise at least one register (e.g. one or more registers) collectively referred to as the register 410, and further comprise a control unit 420 and a thermal sensor 430, where the control unit 420 can be implemented with logic circuits 422. The thermal control unit 119TC can utilize the register 410 to store the threshold THRESHOLD such as the first temperature threshold $\delta_H$ and the second temperature threshold $\delta_L$ as the register values 412 (labeled "Value" for brevity) thereof. The control unit 420 can control operations of the thermal control unit 119TC. For example, the control unit 420 can clear the register 410 by default. The microprocessor 112 can write the threshold THRESHOLD such as the first temperature threshold $\delta_H$ and the second temperature threshold $\delta_L$ into the register 410. In addition, the control unit 420 can obtain the threshold THRESHOLD such as the first temperature threshold $\delta_H$ and the second temperature threshold $\delta_L$ from the register 410, obtain the temperature T sensed by the thermal sensor 430, and determine whether the temperature T reaches the threshold THRESHOLD, and more particularly, determine whether the temperature T reaches any of the first temperature threshold $\delta_H$ and the second temperature threshold $\delta_L$. For example, when T>$\delta_H$, the control unit 420 can send the interrupt signal INTERRUPT to the microprocessor 112 to notify the microprocessor 112 of the first temperature-related detection result (e.g. the temperature T reaching the threshold THRESHOLD such as the first temperature threshold $\delta_H$). For another example, when T<$\delta_L$, the control unit 420 can send the interrupt signal INTERRUPT to the microprocessor 112 to notify the microprocessor 112 of the second temperature-related detection result (e.g. the temperature T reaching the threshold THRESHOLD such as the second temperature threshold $\delta_L$). Additionally, the control unit 420 can send the temperature signal TEMPERATURE carrying the latest value of the temperature T to the microprocessor 112, for being read by the microprocessor 112. As the thermal control unit 119TC can be positioned at the predetermined intra-controller location of the memory controller 110, the microprocessor 112 can utilize the thermal control unit 119TC to accurately monitor the temperature T at the predetermined intra-controller location.

For example, the predetermined intra-controller location may represent a predetermined sub-area of a chip area of an integrated circuit (IC) for implementing the memory controller 110, where the predetermined sub-area may correspond to the transmission interface circuit 118, and the temperature T may represent the temperature of the transmission interface circuit 118. For better comprehension, the predetermined intra-controller location may represent a location next to the transmission interface circuit 118 or an intra-interface location within the transmission interface circuit 118, but the present invention is not limited thereto. In addition, the second temperature threshold $\delta_L$ is typically less than the first temperature threshold $\delta_H$. For better comprehension, the first temperature threshold $\delta_H$ can be equal to any first predetermined value among multiple first predetermined values in a predetermined abnormal temperature range above a predetermined normal temperature range, and the second temperature threshold $\delta_L$ can be equal to any second predetermined value among multiple second predetermined values in the predetermined normal temperature range. For example, $\delta_H$=80 (° C.) and $\delta_L$=50 (° C.), but the present invention is not limited thereto. In some examples, the first temperature threshold $\delta_H$ and/or the second temperature threshold $\delta_L$ may vary.

Figure 5:
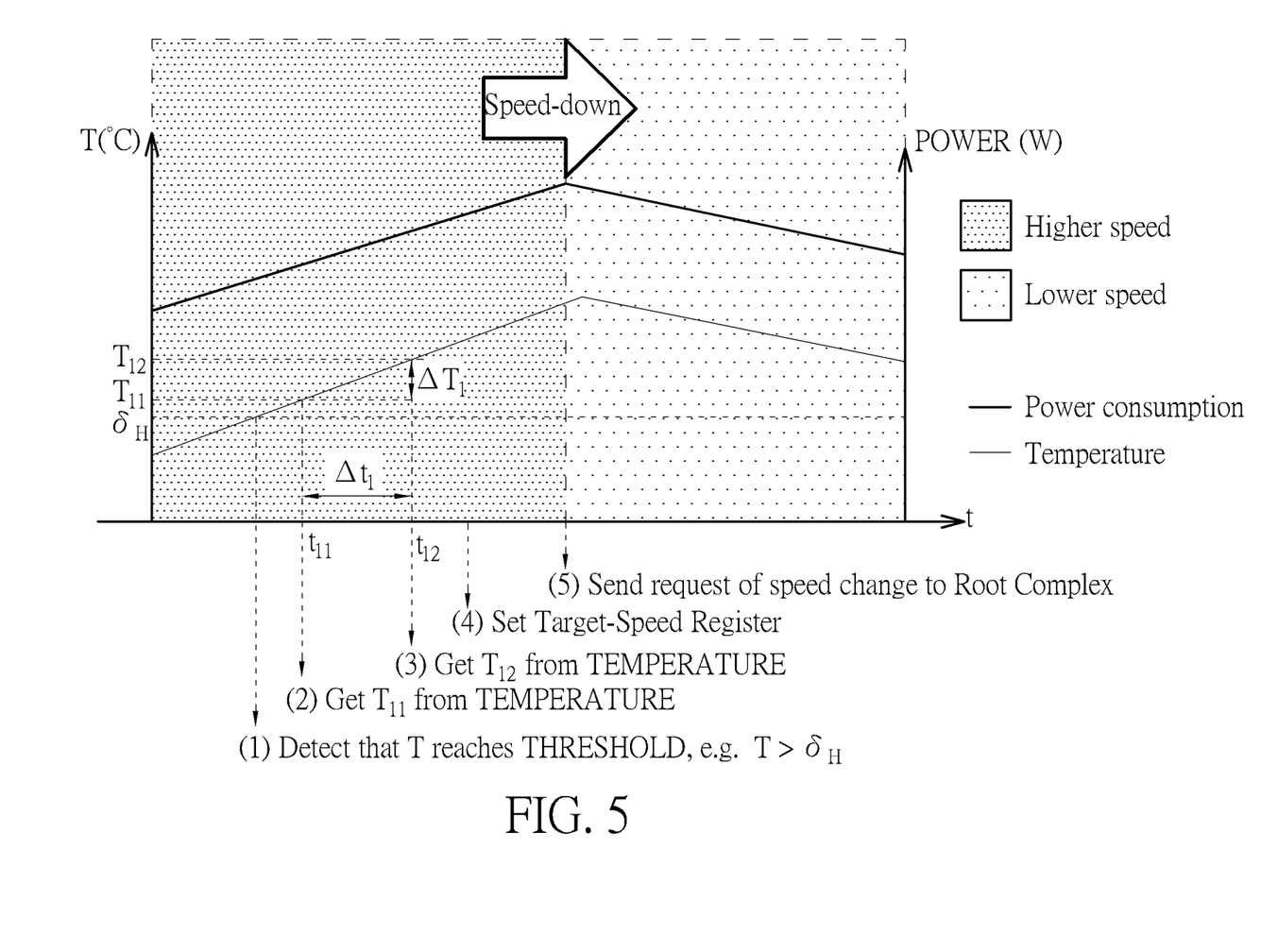
FIG. 5 illustrates a speed-down control scheme of the data accessing method according to an embodiment of the present invention.

FIG. 5 illustrates a speed-down control scheme of the data accessing method according to an embodiment of the present invention, where the power consumption POWER of the memory controller 110 (e.g. the transmission interface circuit 118) may vary with respect to time, and may be measured in unit of Watt (W). For better comprehension, the memory controller 110 (e.g. under control of the microprocessor 112) can reduce the power consumption POWER with various control schemes such as a Dynamic Voltage and Frequency Scaling (DVFS) control scheme regarding the microprocessor 112, the speed-down control scheme regarding the transmission interface circuit 118, etc., and more particularly, can decrease an operational frequency of the microprocessor 112 and decrease the communications speed (e.g. transfer rate) of the transmission interface circuit 118, but the present invention is not limited thereto. For example, the memory controller 110 can merely decrease the communications speed (e.g. transfer rate) of the transmission interface circuit 118, without adjusting the operational frequency of the microprocessor 112, to guarantee the stability of the whole system of the memory device 100.

As shown in FIG. 5, the memory controller 110 can trigger speed-down of the data transmission between the host device 50 and the memory controller 110 according to the speed-down control scheme, to switch from a higher speed to a lower speed, and the associated operations may comprise:

(1) with aid of the thermal control unit 119TC, the microprocessor 112 detects that the temperature T reaches the threshold THRESHOLD, for example, $T>\delta_H$;
(2) the microprocessor 112 gets a first temperature value $T_{11}$ from the temperature signal TEMPERATURE at a first start time point $t_{11}$;
(3) the microprocessor 112 gets a second temperature value $T_{12}$ from the temperature signal TEMPERATURE at a first end time point $t_{12}$;
(4) the microprocessor 112 sets the Target-Speed Register such as the register REG2, to notify the transmission interface circuit 118 of the target communications speed, where the microprocessor 112 can determine the target communications speed according to an increment $\Delta T_1$ (e.g. a positive value such as the difference ($T_{12}-T_{11}$) between the second temperature value $T_{12}$ and the first temperature value $T_{11}$), for example, based on at least one first predetermined rule (e.g. one or more first predetermined rules); and
(5) the microprocessor 112 sets the Trigger-Speed-Change Register such as the register REG1, to make the transmission interface circuit 118 send a request of speed change to the Root Complex, where this request indicates the target communications speed;
but the present invention is not limited thereto. In some examples, the associated operations of the speed-down control scheme may vary.

Figure 6:
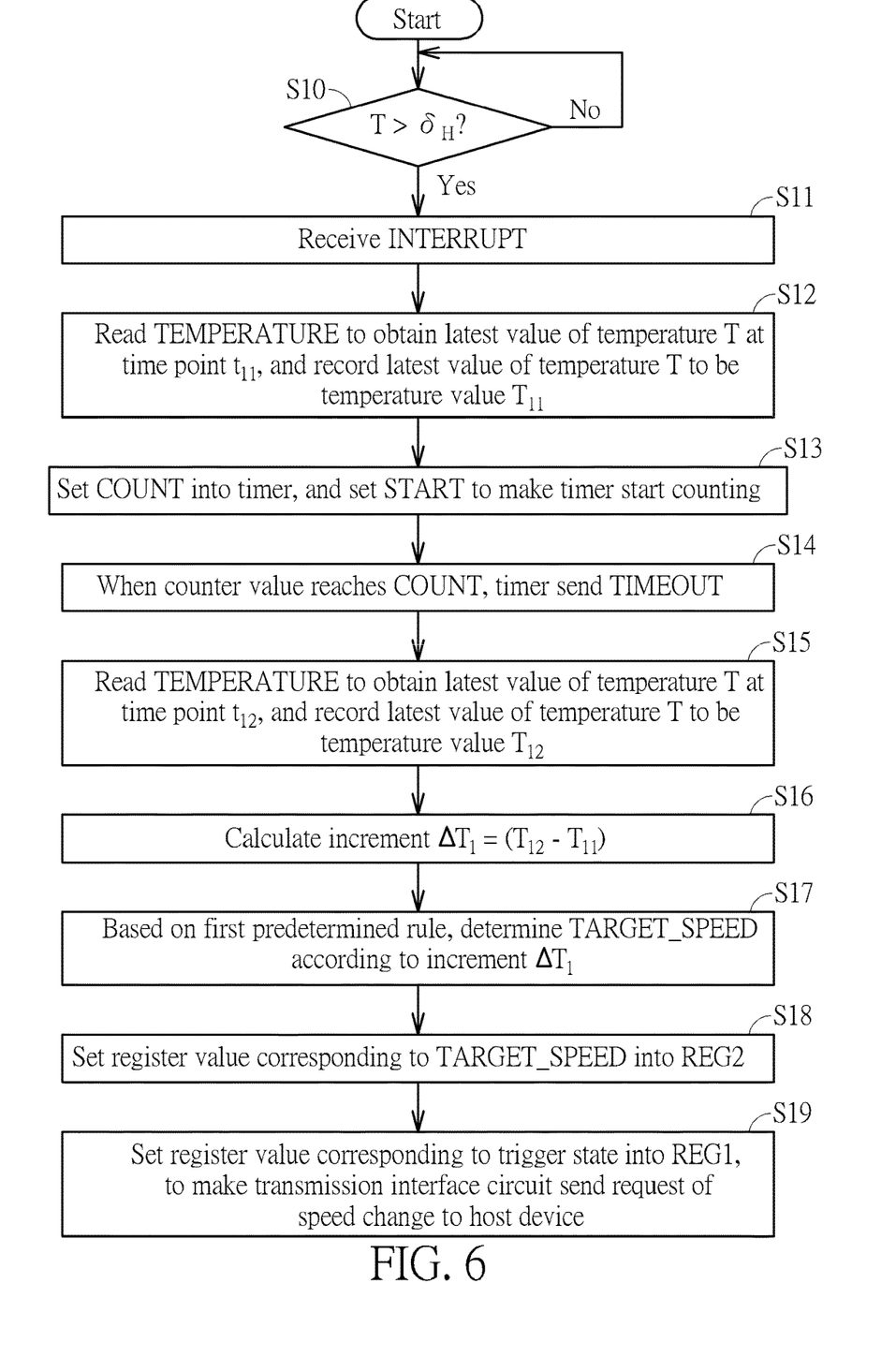
FIG. 6 illustrates a working flow of the speed-down control scheme shown in FIG. 5 according to an embodiment of the present invention.

FIG. 6 illustrates a working flow of the speed-down control scheme shown in FIG. 5 according to an embodiment of the present invention.

In Step S10, the thermal control unit 119TC can check whether the temperature T reaches the threshold THRESHOLD such as the first temperature threshold $\delta_H$ in the increasing direction of the temperature T (e.g. $T \geq \delta_H$), and more particularly, check whether the temperature T is greater than the first temperature threshold $\delta_H$. If Yes (e.g. $T>\delta_H$), Step S11 is entered; if No, Step S10 is entered.

In Step S11, when $T>\delta_H$, the microprocessor 112 can receive the interrupt signal INTERRUPT from the thermal control unit 119TC. For example, the thermal control unit 119TC can send the interrupt signal INTERRUPT to the microprocessor 112 when detecting that $T>\delta_H$.

In Step S12, after receiving the interrupt signal INTERRUPT, the microprocessor 112 can read the temperature signal TEMPERATURE to obtain the latest value of the temperature T at the first start time point $t_{11}$, and record the latest value of the temperature T to be the first temperature value $T_{11}$ corresponding to the first start time point $t_{11}$.

In Step S13, the microprocessor 112 can set the predetermined counter value COUNT (e.g. a first predetermined counter value corresponding to a first predetermined time difference) into the timer 119TR, and set the start counting signal START to make the timer 119TR (e.g. the counter 330 therein) start counting.

In Step S14, when the counter value of the counter 330 reaches the predetermined counter value COUNT, the timer 119TR can send the timeout signal TIMEOUT to notify the microprocessor 112 of timeout.

In Step S15, after receiving the timeout signal TIMEOUT, the microprocessor 112 can read the temperature signal TEMPERATURE to obtain the latest value of the temperature T at the first end time point $t_{12}$, and record the latest value of the temperature T to be the second temperature value $T_{12}$ corresponding to the first end time point $t_{12}$.

In Step S16, the microprocessor 112 can calculate the increment $\Delta T_1$ such as the difference ($T_{12}-T_{11}$) between the second temperature value $T_{12}$ and the first temperature value $T_{11}$.

In Step S17, based on the at least one first predetermined rule, the microprocessor 112 can determine the target communications speed according to the increment $\Delta T_1$. For example, in a situation where an original communications speed such as the higher speed represents the PCIe Generation (Gen) 4 Speed Gen_4_Speed (e.g. 16 GT/s), the microprocessor 112 can determine the target communications speed TARGET_SPEED such as the lower speed to be a first communications speed among a first set of predetermined communications speeds, such as one of the PCIe Gen 1 Speed Gen_1_Speed (e.g. 2.5 GT/s), the PCIe Gen 2 Speed Gen_2_Speed (e.g. 5 GT/s) and the PCIe Gen 3 Speed Gen_3_Speed (e.g. 8 GT/s) that are less than the PCIe Gen 4 Speed Gen_4_Speed, and the at least one first predetermined rule may comprise:

(1) if $\Delta T_1 > \alpha_1$, TARGET_SPEED=Gen_1_Speed;
(2) if $\alpha_1 > \Delta T_1 > \beta_1$, TARGET_SPEED=Gen_2_Speed; and
(3) if $\beta_1 > \Delta T_1 > \gamma_1$, TARGET_SPEED=Gen_3_Speed;
where $\alpha_1 > \beta_1 > \gamma_1$, but the present invention is not limited thereto. In another example, the above rules can be re-written as follows:
(1) if $\Delta T_1 \geq \alpha_1$, TARGET_SPEED=Gen_1_Speed;
(2) if $\alpha_1 > \Delta T_1 \geq \beta_1$, TARGET_SPEED=Gen_2_Speed; and
(3) if $\beta_1 > \Delta T_1 \geq \gamma_1$, TARGET_SPEED=Gen_3_Speed;
where $\alpha_1 > \beta_1 > \gamma_1 > 0$. In some examples, the original communications speed such as the higher speed may represent any communications speed among the PCIe Gen 2 Speed Gen_2_Speed, the PCIe Gen 3 Speed Gen_3_Speed, the PCIe Gen 4 Speed Gen_4_Speed, the PCIe Gen 5 Speed Gen_5_Speed (e.g. 32 GT/s), etc., and the target communications speed TARGET_SPEED such as the lower speed may represent one of another set of predetermined communications speeds less than the any communications speed.

In Step S18, the microprocessor 112 can set a register value corresponding to the target communications speed TARGET_SPEED determined in Step S17 into the register REG2, to notify the transmission interface circuit 118 of the target communications speed TARGET_SPEED through the register REG2, where this register value of the register REG2 indicates the target communications speed TARGET_SPEED determined in Step S17.

In Step S19, the microprocessor 112 can set a register value corresponding to a trigger state into the register REG1, to make the transmission interface circuit 118 send a request of speed change to the host device 50 (e.g. the Root Complex), where this request indicates the target communications speed TARGET_SPEED determined in Step S17.

For better comprehension, the method may be illustrated with the working flow shown in FIG. 6, but the present invention is not limited thereto. According to some embodiments, one or more steps may be added, deleted, or changed in the working flow shown in FIG. 6.

Figure 7:
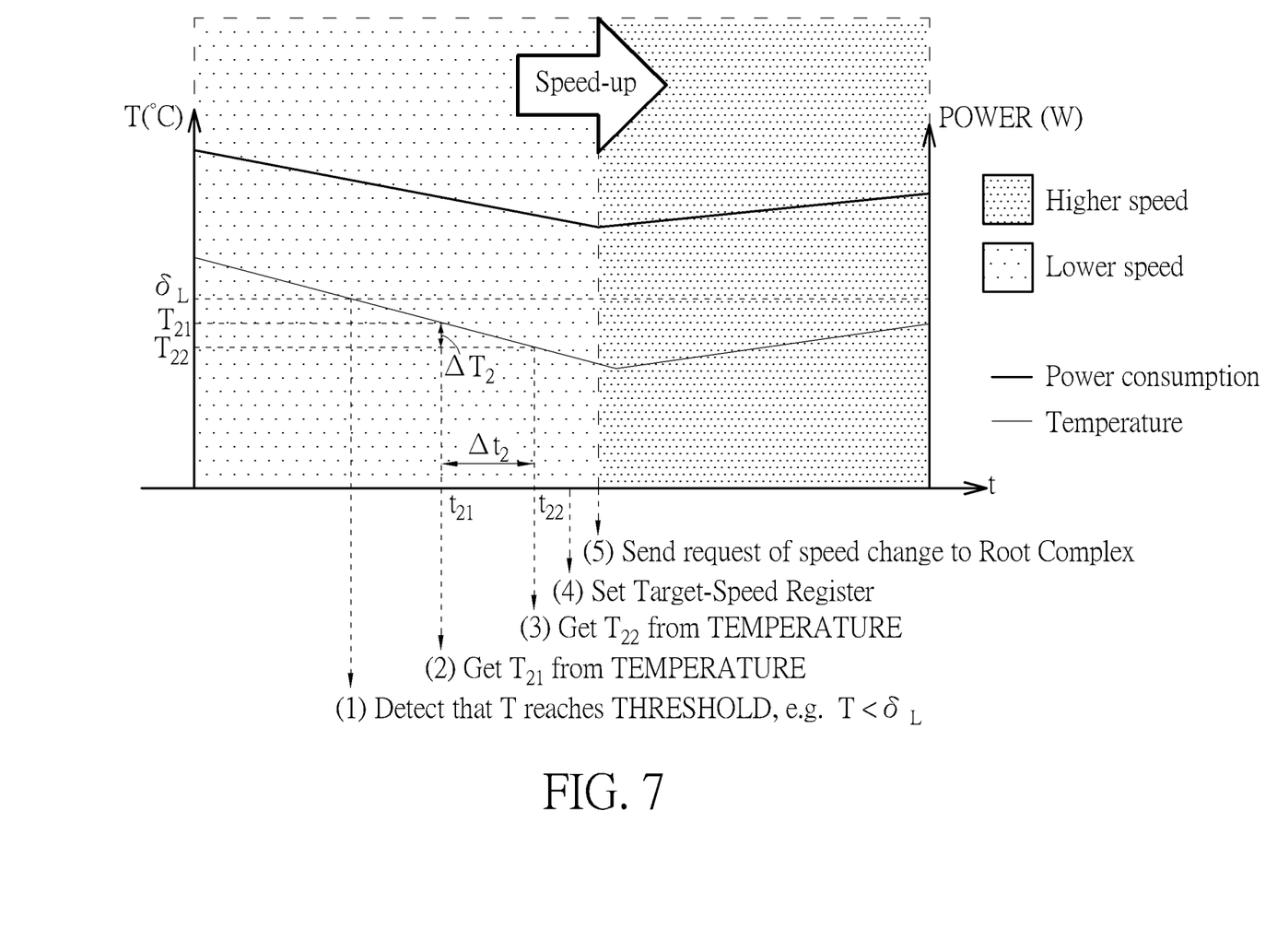
FIG. 7 illustrates a speed-up control scheme of the data accessing method according to an embodiment of the present invention.

FIG. 7 illustrates a speed-up control scheme of the data accessing method according to an embodiment of the present invention. For better comprehension, the memory controller 110 (e.g. under control of the microprocessor 112) can enhance the overall processing performance with various control schemes such as the DVFS control scheme regarding the microprocessor 112, the speed-up control scheme regarding the transmission interface circuit 118, etc., and more particularly, can increase the operational frequency of the microprocessor 112 and increase the communications speed (e.g. transfer rate) of the transmission interface circuit 118, where the power consumption POWER will be increased correspondingly, but the present invention is not limited thereto. For example, the memory controller 110 can merely increase the communications speed (e.g. transfer rate) of the transmission interface circuit 118, without adjusting the operational frequency of the microprocessor 112, to guarantee the stability of the whole system of the memory device 100.

As shown in FIG. 7, the memory controller 110 can trigger speed-up of the data transmission between the host device 50 and the memory controller 110 according to the speed-up control scheme, to switch from a lower speed to a higher speed, and the associated operations may comprise:
(1) with aid of the thermal control unit 119TC, the microprocessor 112 detects that the temperature T reaches the threshold THRESHOLD, for example, $T<\delta_L$;
(2) the microprocessor 112 gets a first temperature value $T_{21}$ from the temperature signal TEMPERATURE at a second start time point $t_{21}$;
(3) the microprocessor 112 gets a second temperature value $T_{22}$ from the temperature signal TEMPERATURE at a second end time point $t_{22}$;
(4) the microprocessor 112 sets the Target-Speed Register such as the register REG2, to notify the transmission interface circuit 118 of the target communications speed, where the microprocessor 112 can determine the target communications speed according to a decrement $\Delta T_2$ (e.g. a positive value such as the difference $(T_{21}-T_{22})$ between the first temperature value $T_{21}$ and the second temperature value $T_{22}$, or an absolute value $|(T_{22}-T_{21})|$ of another difference $(T_{22}-T_{21})$ if it is calculated by subtracting $T_{21}$ from $T_{22}$), for example, based on at least one second predetermined rule (e.g. one or more second predetermined rules); and
(5) the microprocessor 112 sets the Trigger-Speed-Change Register such as the register REG1, to make the transmission interface circuit 118 send a request of speed change to the Root Complex, where this request indicates the target communications speed;
but the present invention is not limited thereto. In some examples, the associated operations of the speed-up control scheme may vary.

Figure 8:
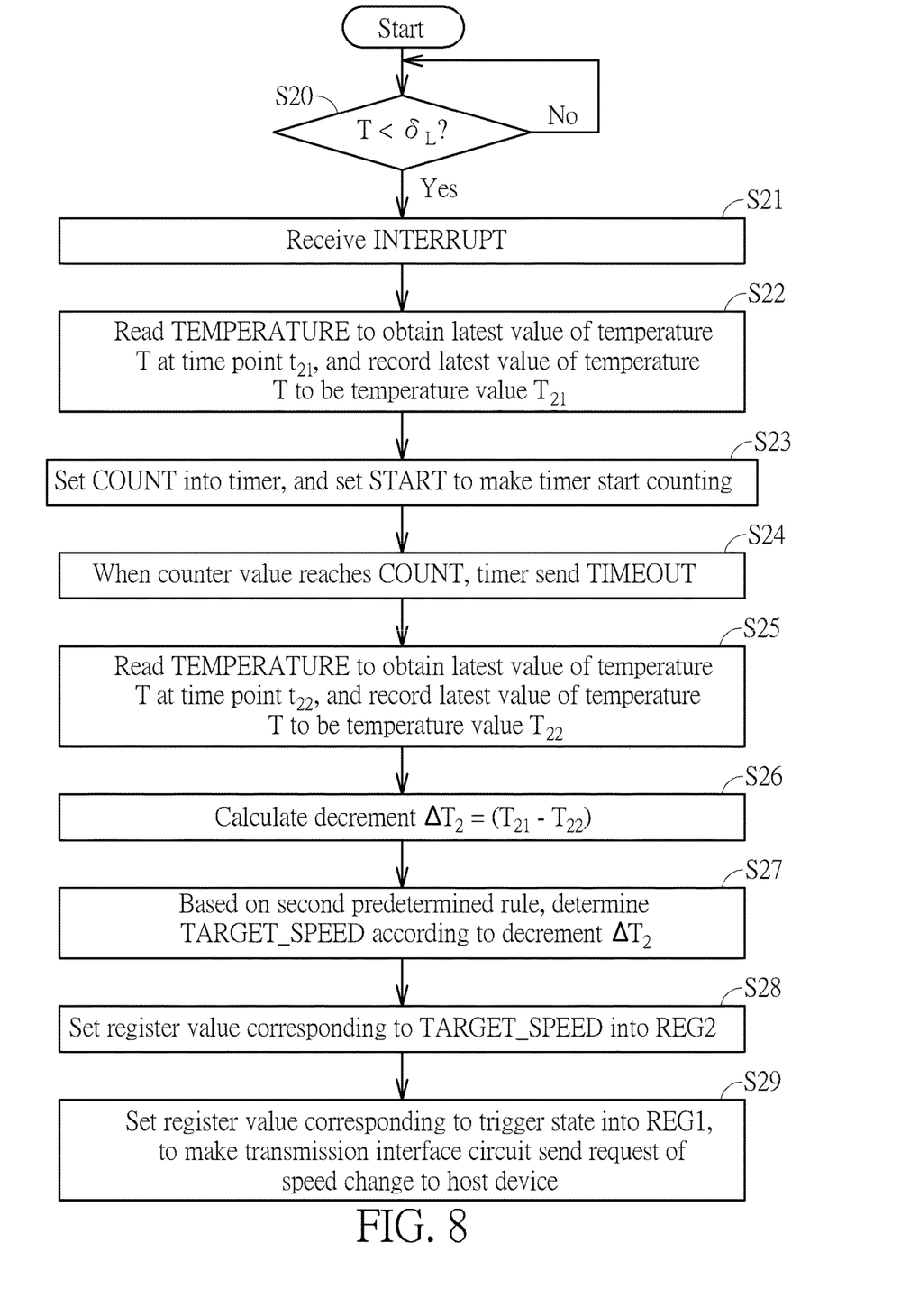
FIG. 8 illustrates a working flow of the speed-up control scheme shown in FIG. 7 according to an embodiment of the present invention.

FIG. 8 illustrates a working flow of the speed-up control scheme shown in FIG. 7 according to an embodiment of the present invention.

In Step S20, the thermal control unit 119TC can check whether the temperature T reaches the threshold THRESHOLD such as the second temperature threshold $\delta_L$ in the decreasing direction of the temperature T (e.g. $T \leq \delta_L$), and more particularly, check whether the temperature T is less than the second temperature threshold $\delta_L$. If Yes (e.g. $T<\delta_L$), Step S21 is entered; if No, Step S20 is entered.

In Step S21, when $T<\delta_L$, the microprocessor 112 can receive the interrupt signal INTERRUPT from the thermal control unit 119TC. For example, the thermal control unit 119TC can send the interrupt signal INTERRUPT to the microprocessor 112 when detecting that $T<\delta_L$.

In Step S22, after receiving the interrupt signal INTERRUPT, the microprocessor 112 can read the temperature signal TEMPERATURE to obtain the latest value of the temperature T at the second start time point $t_{21}$, and record the latest value of the temperature T to be the first temperature value $T_{21}$ corresponding to the second start time point $t_{21}$.

In Step S23, the microprocessor 112 can set the predetermined counter value COUNT (e.g. a second predetermined counter value corresponding to a second predetermined time difference) into the timer 119TR, and set the start counting signal START to make the timer 119TR (e.g. the counter 330 therein) start counting. For example, the second predetermined counter value can be the same as the first predetermined counter value, and the second predetermined time difference can be the same as the first predetermined time difference. For another example, the second predetermined counter value can be different from the first predetermined counter value, and the second predetermined time difference can be different from the first predetermined time difference.

In Step S24, when the counter value of the counter 330 reaches the predetermined counter value COUNT, the timer 119TR can send the timeout signal TIMEOUT to notify the microprocessor 112 of timeout.

In Step S25, after receiving the timeout signal TIMEOUT, the microprocessor 112 can read the temperature signal TEMPERATURE to obtain the latest value of the temperature T at the second end time point $t_{22}$, and record the latest value of the temperature T to be the second temperature value $T_{22}$ corresponding to the second end time point $t_{22}$.

In Step S26, the microprocessor 112 can calculate the decrement $\Delta T_2$ such as the difference $(T_{21}-T_{22})$ between the first temperature value $T_{21}$ and the second temperature value $T_{22}$.

In Step S27, based on the at least one second predetermined rule, the microprocessor 112 can determine the target communications speed according to the decrement $\Delta T_2$. For example, in a situation where the first communications speed such as the lower speed represents the PCIe Gen 1 Speed Gen_1_Speed, the microprocessor 112 can determine the target communications speed TARGET_SPEED such as the higher speed to be a second communications speed among a second set of predetermined communications speeds, such as one of the PCIe Gen 4 Speed Gen_4_Speed, the PCIe Gen 3 Speed Gen_3_Speed and the PCIe Gen 2 Speed Gen_2_Speed that are greater than the PCIe Gen 1 Speed Gen_1_Speed, and the at least one second predetermined rule may comprise:
(1) if $\Delta T_2 > \alpha_2$, TARGET_SPEED=Gen_4_Speed;
(2) if $\alpha_2 > \Delta T_2 > \beta_2$, TARGET_SPEED=Gen_3_Speed; and
(3) if $\beta_2 > \Delta T_2 > \gamma_2$, TARGET_SPEED=Gen_2_Speed;
where $\alpha_2 > \beta_2 > \gamma_2$, but the present invention is not limited thereto. In another example, the above rules can be re-written as follows:
(1) if $\Delta T_2 \geq \alpha_2$, TARGET_SPEED=Gen_4_Speed;
(2) if $\alpha_2 > \Delta T_2 > \beta_2$, TARGET_SPEED=Gen_3_Speed; and
(3) if $\beta_2 > \Delta T_2 > \gamma_2$, TARGET_SPEED=Gen_2_Speed;
where $\alpha_2 > \beta_2 > \gamma_2 > 0$. In some examples, the first communications speed such as the lower speed may represent any communications speed among the PCIe Gen 1 Speed Gen_1_Speed, the PCIe Gen 2 Speed Gen_2_Speed, the PCIe Gen 3 Speed Gen_3_Speed, the PCIe Gen 4 Speed Gen_4_Speed, the PCIe Gen 5 Speed Gen_5_Speed, etc. except the highest communications speed available (e.g. the PCIe Gen 6 Speed Gen_6_Speed such as 64 GT/s), and the target communications speed TARGET_SPEED such as the higher speed may represent one of another set of predetermined communications speeds greater than the any communications speed.

In Step S28, the microprocessor 112 can set a register value corresponding to the target communications speed TARGET_SPEED determined in Step S27 into the register REG2, to notify the transmission interface circuit 118 of the target communications speed TARGET_SPEED through the register REG2, where this register value of the register REG2 indicates the target communications speed TARGET_SPEED determined in Step S27.

In Step S29, the microprocessor 112 can set the register value corresponding to the trigger state into the register REG1, to make the transmission interface circuit 118 send a request of speed change to the host device 50 (e.g. the Root Complex), where this request indicates the target communications speed TARGET_SPEED determined in Step S27.

For better comprehension, the method may be illustrated with the working flow shown in FIG. 8, but the present invention is not limited thereto. According to some embodiments, one or more steps may be added, deleted, or changed in the working flow shown in FIG. 8.

Figure 9:
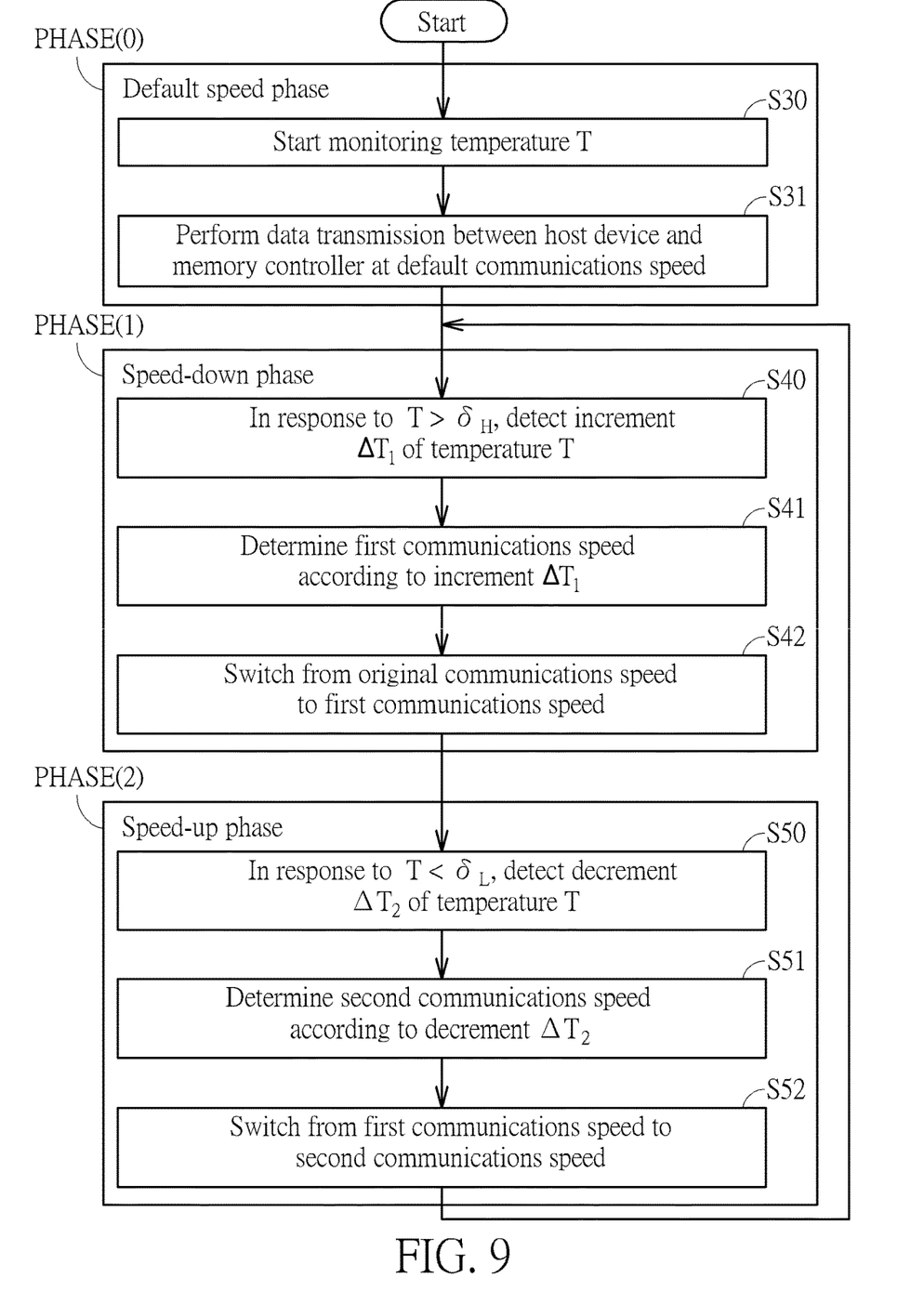
FIG. 9 is a flowchart of the data accessing method using dynamic speed adjustment with aid of the thermal control unit according to an embodiment of the present invention.

FIG. 9 is a flowchart of the data accessing method using dynamic speed adjustment with aid of the thermal control unit according to an embodiment of the present invention. For example, Steps S30 and S31 can be performed in a default speed phase PHASE(0), Steps S40-S42 can be performed in a speed-down phase PHASE(1), and Steps S50-S52 can be performed in a speed-up phase PHASE(2).

In Step S30, the memory controller 110 can utilize the thermal control unit 119TC to start monitoring the temperature T at the predetermined intra-controller location of the memory controller 110.

In Step S31, in response to at least one accessing request (e.g. one or more accessing requests, such as one or more read requests and/or one or more write requests) from the host device 50, the memory controller 110 can control the transmission interface circuit 118 to perform data transmission between the host device 50 and the memory controller 110 at a default communications speed (e.g. the highest communications speed available among all PCIe multi-Gen Speeds such as the PCIe Gen 1 Speed Gen_1_Speed, the PCIe Gen 2 Speed Gen_2_Speed, the PCIe Gen 3 Speed Gen_3_Speed, the PCIe Gen 4 Speed Gen_4_Speed, etc.), for accessing (e.g. reading or writing) data in the NV memory 120, but the present invention is not limited thereto. For example, in response to the aforementioned at least one accessing request, the memory controller 110 can continue accessing the NV memory 120 in one or more subsequent phases, and more particularly, control the transmission interface circuit 118 to perform data transmission between the host device 50 and the memory controller 110 at one or more other communications speeds (e.g. one or more of the remaining communications speeds among all PCIe multi-Gen Speeds such as the PCIe Gen 1 Speed Gen_1_Speed, the PCIe Gen 2 Speed Gen_2_Speed, the PCIe Gen 3 Speed Gen_3_Speed, the PCIe Gen 4 Speed Gen_4_Speed, etc.) in one or more phases among the speed-down phase PHASE(1) and the speed-up phase PHASE(2), for accessing data in the NV memory 120.

In Step S40, in response to the temperature T being greater than the first temperature threshold $\delta_H$, the memory controller 110 can detect an increment $\Delta T_1$ of the temperature T between a first start time point $t_{11}$ and a first end time point $t_{12}$, where a first time period $\Delta t_1$ from the first start time point $t_{11}$ to the first end time point $t_{12}$ can be configured to correspond to the first predetermined time difference. For example, the memory controller 110 can correctly control the first time period $\Delta t_1$ with aid of the timer 119TR, to make the first time period $\Delta t_1$ be equal to the first predetermined time difference.

In Step S41, based on the aforementioned at least one first predetermined rule, the memory controller 110 can determine a first communications speed (e.g. the lower speed of the speed-down control scheme) according to the increment $\Delta T_1$.

In Step S42, the memory controller 110 can control the transmission interface circuit 118 to switch from an original communications speed (e.g. the higher speed of the speed-down control scheme, such as the default communications speed or a previously increased communications speed of the speed-up phase PHASE(2) in a previous iteration of the loop shown in FIG. 9) to the first communications speed, for performing data transmission between the host device 50 and the memory controller 110 at the first communications speed.

In Step S50, in response to the temperature T being less than the second temperature threshold $\delta_L$, the memory controller 110 can detect a decrement $\Delta T_2$ of the temperature T between a second start time point $t_{21}$ and a second end time point $t_{22}$, where a second time period $\Delta t_2$ from the second start time point $t_{21}$ to the second end time point $t_{22}$ can be configured to correspond to the second predetermined time difference. For example, the memory controller 110 can correctly control the second time period $\Delta t_2$ with aid of the timer 119TR, to make the second time period $\Delta t_2$ be equal to the second predetermined time difference.

In Step S51, based on the aforementioned at least one second predetermined rule, the memory controller 110 can determine a second communications speed (e.g. the higher speed of the speed-up control scheme) according to the decrement $\Delta T_2$.

In Step S52, the memory controller 110 can control the transmission interface circuit 118 to switch from the first communications speed (e.g. the lower speed of the speed-up control scheme) to the second communications speed, for performing data transmission between the host device 50 and the memory controller 110 at the second communications speed, where the first communications speed may represent a decreased communications speed that is just used in the speed-down phase PHASE(1).

Regarding the speed-down phase PHASE(1), the aforementioned at least one first predetermined rule can be arranged to map a first set of possible ranges of the increment $\Delta T_1$ to a first set of predetermined communications speeds (e.g. a set of candidate communications speeds for being selected as the target communications speed TARGET_SPEED such as the lower speed of the speed-down control scheme), respectively. The first set of possible ranges may correspond to the respective ranges of the intervals ($\gamma_1$, $\beta_1$), ($\beta_1$, $\alpha_1$) and ($\alpha_1$, $\infty$), and more particularly, comprise the respective ranges of varied (e.g. half-open and/or closed) and/or non-varied versions of these intervals, where each of the values $\alpha_1$, $\beta_1$ and $\gamma_1$ may be added into an associated interval of these intervals as an endpoint of the associated interval. For example, the first set of possible ranges may comprise the respective ranges of the intervals [$\gamma_1$, $\beta_1$), [$\beta_1$, $\alpha_1$) and [$\alpha_1$, $\infty$). For another example, the first set of possible ranges may comprise the respective ranges of the intervals [$\gamma_1$, $\beta_1$], ($\beta_1$, $\alpha_1$) and [$\alpha_1$, $\infty$). In Step S41, in response to the increment $\Delta T_1$ falling within a possible range among the first set of possible ranges of the increment $\Delta T_1$, the memory controller 110 can select a predetermined communications speed corresponding to the possible range from the first set of predetermined communications speeds. For example, the aforementioned at least one first predetermined rule may comprise mapping relationships between the first set of possible ranges and the first set of predetermined communications speeds.

Regarding the speed-up phase PHASE(2), the aforementioned at least one second predetermined rule can be arranged to map a second set of possible ranges of the decrement $\Delta T_2$ to a second set of predetermined communications speeds (e.g. a set of candidate communications speeds for being selected as the target communications speed TARGET_SPEED such as the higher speed of the speed-up control scheme), respectively. The second set of possible ranges may correspond to the respective ranges of the intervals $(\gamma_2, \beta_2)$, $(\beta_2, \alpha_2)$ and $(\alpha_2, \infty)$, and more particularly, comprise the respective ranges of varied (e.g. half-open and/or closed) and/or non-varied versions of these intervals, where each of the values $\alpha_2$, $\beta_2$ and $\gamma_2$ may be added into an associated interval of these intervals as an endpoint of the associated interval. For example, the second set of possible ranges may comprise the respective ranges of the intervals $[\gamma_2, \beta_2)$, $[\beta_2, \alpha_2)$ and $[\alpha_2, \infty)$. For another example, the second set of possible ranges may comprise the respective ranges of the intervals $[\gamma_2, \beta_2]$, $(\beta_2, \alpha_2)$ and $[\alpha_2, \infty)$. In Step S51, in response to the decrement $\Delta T_2$ falling within a possible range among the second set of possible ranges of the decrement $\Delta T_2$, the memory controller 110 can select a predetermined communications speed corresponding to the possible range from the second set of predetermined communications speeds. For example, the aforementioned at least one second predetermined rule may comprise mapping relationships between the second set of possible ranges and the second set of predetermined communications speeds. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9. For example, a first partial working flow comprising Steps S40-S42 may be repeated (e.g. by executing Steps S40-S42 multiple times) to speed down multiple times in the speed-down phase PHASE(1), and a second partial working flow comprising Steps S50-S52 may be repeated (e.g. by executing Steps S50-S52 multiple times) to speed up multiple times in the speed-up phase PHASE(2).

According to some embodiments, in response to at least one additional accessing request (e.g. one or more additional accessing requests, such as one or more additional read requests and/or one or more additional write requests), the memory controller 110 can control the transmission interface circuit 118 to perform data transmission between the host device 50 and the memory controller 110 at any of all communications speeds available (e.g. any communications speed among all PCIe multi-Gen Speeds such as the PCIe Gen 1 Speed Gen_1_Speed, the PCIe Gen 2 Speed Gen_2_Speed, the PCIe Gen 3 Speed Gen_3_Speed, the PCIe Gen 4 Speed Gen_4_Speed, etc.) in any phase among the speed-down phase PHASE(1) and the speed-up phase PHASE(2), for accessing data in the NV memory 120. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data accessing method using dynamic speed adjustment with aid of a thermal control unit, the data accessing method being applicable to a memory controller of a memory device, the memory device comprising the memory controller and a non-volatile (NV) memory, the NV memory comprising at least one NV memory element, the data accessing method comprising:
utilizing the thermal control unit within the memory controller to start monitoring temperature at a predetermined intra-controller location of the memory controller;
in response to at least one accessing request from a host device, controlling a transmission interface circuit of the memory controller to perform data transmission between the host device and the memory controller at an original communications speed, for accessing data in the NV memory;
in response to the temperature being greater than a first temperature threshold, detecting an increment of the temperature between a first start time point and a first end time point, wherein a first time period from the first start time point to the first end time point corresponds to a first predetermined time difference;
based on at least one first predetermined rule, determining a first communications speed according to the increment;
controlling the transmission interface circuit to switch from the original communications speed to the first communications speed, for performing data transmission between the host device and the memory controller at the first communications speed;
in response to the temperature being less than a second temperature threshold, detecting a decrement of the temperature between a second start time point and a second end time point, wherein a second time period from the second start time point to the second end time point corresponds to a second predetermined time difference;
based on at least one second predetermined rule, determining a second communications speed according to the decrement; and
controlling the transmission interface circuit to switch from the first communications speed to the second communications speed, for performing data transmission between the host device and the memory controller at the second communications speed.

2. The data accessing method of claim 1, wherein the at least one first predetermined rule is arranged to map a first set of possible ranges of the increment to a first set of predetermined communications speeds, respectively.

3. The data accessing method of claim 1, wherein determining the first communications speed according to the increment further comprises:
in response to the increment falling within a possible range among a first set of possible ranges of the increment, selecting a predetermined communications speed corresponding to the possible range from a first set of predetermined communications speeds, wherein the at least one first predetermined rule comprises mapping relationships between the first set of possible ranges and the first set of predetermined communications speeds.

4. The data accessing method of claim 1, wherein the at least one second predetermined rule is arranged to map a second set of possible ranges of the decrement to a second set of predetermined communications speeds, respectively.

5. The data accessing method of claim 1, wherein determining the second communications speed according to the decrement further comprises:
in response to the decrement falling within a possible range among a second set of possible ranges of the decrement, selecting a predetermined communications speed corresponding to the possible range from a second set of predetermined communications speeds, wherein the at least one second predetermined rule comprises mapping relationships between the second set of possible ranges and the second set of predetermined communications speeds.

6. The data accessing method of claim 1, wherein the second temperature threshold is less than the first temperature threshold.

7. The data accessing method of claim 1, wherein the predetermined intra-controller location represents a predetermined sub-area of a chip area of an integrated circuit (IC) for implementing the memory controller, wherein the predetermined sub-area corresponds to the transmission interface circuit, and the temperature is of the transmission interface circuit.

8. A memory controller of a memory device, the memory device comprising the memory controller and a non-volatile (NV) memory, the NV memory comprising at least one NV memory element, the memory controller comprising:
- a processing circuit, arranged to control the memory controller according to a plurality of host commands from a host device, to allow the host device to access the NV memory through the memory controller;
- a transmission interface circuit, coupled to the processing circuit, arranged to perform communications with the host device; and
- a memory device protection circuit, coupled to the processing circuit, arranged to perform memory device protection on the memory device, wherein the memory device protection circuit comprises:
  - a thermal control unit, arranged to perform thermal control, for triggering dynamic speed adjustment during data accessing;

wherein:
- the memory controller utilizes the thermal control unit to start monitoring temperature at a predetermined intra-controller location of the memory controller;
- in response to at least one accessing request from the host device, the memory controller controls the transmission interface circuit to perform data transmission between the host device and the memory controller at an original communications speed, for accessing data in the NV memory;
- in response to the temperature being greater than a first temperature threshold, the memory controller detects an increment of the temperature between a first start time point and a first end time point, wherein a first time period from the first start time point to the first end time point corresponds to a first predetermined time difference;
- based on at least one first predetermined rule, the memory controller determines a first communications speed according to the increment;
- the memory controller controls the transmission interface circuit to switch from the original communications speed to the first communications speed, for performing data transmission between the host device and the memory controller at the first communications speed;
- in response to the temperature being less than a second temperature threshold, the memory controller detects a decrement of the temperature between a second start time point and a second end time point, wherein a second time period from the second start time point to the second end time point corresponds to a second predetermined time difference;
- based on at least one second predetermined rule, the memory controller determines a second communications speed according to the decrement; and
- the memory controller controls the transmission interface circuit to switch from the first communications speed to the second communications speed, for performing data transmission between the host device and the memory controller at the second communications speed.

9. The memory device comprising the memory controller of claim 8, wherein the NV memory is arranged to store information; and the memory controller is coupled to the NV memory, and is arranged to control operations of the memory device.

* * * * *